United States Patent
Shan et al.

(10) Patent No.: US 10,299,172 B2
(45) Date of Patent: May 21, 2019

(54) CIRCUIT SWITCHED FALLBACK

(71) Applicant: INTEL IP CORPORATION, Santa Clara, CA (US)

(72) Inventors: Chang Hong Shan, Shanghai (CN); Jerome Parron, Fuerth (DE); Puneet Jain, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 76 days.

(21) Appl. No.: 15/114,718

(22) PCT Filed: Feb. 23, 2015

(86) PCT No.: PCT/US2015/017140
§ 371 (c)(1),
(2) Date: Jul. 27, 2016

(87) PCT Pub. No.: WO2015/127384
PCT Pub. Date: Aug. 27, 2015

(65) Prior Publication Data
US 2016/0345210 A1    Nov. 24, 2016

Related U.S. Application Data

(60) Provisional application No. 62/019,304, filed on Jun. 30, 2014, provisional application No. 61/943,967, (Continued)

(51) Int. Cl.
*H04W 36/14* (2009.01)
*H04W 36/16* (2009.01)
(Continued)

(52) U.S. Cl.
CPC ....... *H04W 36/0022* (2013.01); *H04L 5/0007* (2013.01); *H04W 8/04* (2013.01);
(Continued)

(58) Field of Classification Search
None
See application file for complete search history.

(56) References Cited

U.S. PATENT DOCUMENTS

2010/0130207 A1*  5/2010  Wu ................... H04W 36/0033
                                                    455/436
2010/0172301 A1   7/2010  Watfa et al.
(Continued)

FOREIGN PATENT DOCUMENTS

RU        2476016 C2     2/2013
WO    WO 2014/008667 A1  1/2014

OTHER PUBLICATIONS

3GPP TS23.272, (2014) 3$^{rd}$ Generation Partnership Project; Technical Specification Group Services and System Aspects; Circuit Switched (CS) fallback in Evolved Packet System (EPS); Stage 2 (Release 12).
(Continued)

*Primary Examiner* — Duc T Duong
(74) *Attorney, Agent, or Firm* — Thorpe North & Western

(57) ABSTRACT

Technology for facilitating circuit switched fallback (CSFB) for a user equipment (UE) is disclosed. A mobility management entity (MME) can receive an optimized CSFB capability indicator from the UE. The MME can receive a requested service type associated with the UE. The MME can initiate a single radio voice call continuity (SR-VCC) handover of the UE to a circuit switched network based on the optimized CSFB capability of the UE. The MME can send an S1 application protocol (S1-AP) request message to an evolved node B (eNB). The S1AP message can include the optimized CSFB capability indicator and a single radio voice call continuity (SRVCC) indicator for the UE. The MME can receive a handover required message from the eNB.

23 Claims, 7 Drawing Sheets

Related U.S. Application Data filed on Feb. 24, 2014, provisional application No. 61/943,966, filed on Feb. 24, 2014.

(51) Int. Cl.

| | |
|---|---|
| *H04W 36/24* | (2009.01) |
| *H04W 36/38* | (2009.01) |
| *H04W 36/00* | (2009.01) |
| *H04L 5/00* | (2006.01) |
| *H04W 8/04* | (2009.01) |
| *H04W 48/16* | (2009.01) |
| *H04W 64/00* | (2009.01) |
| *H04W 72/04* | (2009.01) |
| *H04W 8/24* | (2009.01) |
| *H04W 88/02* | (2009.01) |
| *H04W 88/08* | (2009.01) |
| *H04W 88/12* | (2009.01) |
| *H04W 88/14* | (2009.01) |

(52) U.S. Cl.
CPC ......... *H04W 48/16* (2013.01); *H04W 64/003* (2013.01); *H04W 72/042* (2013.01); *H04W 72/0413* (2013.01); *H04W 8/24* (2013.01); *H04W 88/02* (2013.01); *H04W 88/08* (2013.01); *H04W 88/12* (2013.01); *H04W 88/14* (2013.01)

(56) References Cited

U.S. PATENT DOCUMENTS

| | | | | |
|---|---|---|---|---|
| 2010/0329244 | A1* | 12/2010 | Buckley | H04W 76/026 370/352 |
| 2012/0115489 | A1* | 5/2012 | Shuai | H04W 36/14 455/438 |
| 2012/0224564 | A1* | 9/2012 | Paisal | H04N 7/148 370/331 |
| 2013/0063540 | A1 | 3/2013 | Zisimopoulos et al. | |
| 2013/0250032 | A1* | 9/2013 | Andre-Jonsson | H04W 36/0022 348/14.02 |
| 2013/0301614 | A1 | 11/2013 | Lu et al. | |
| 2014/0051443 | A1 | 2/2014 | Diachina et al. | |
| 2014/0064156 | A1* | 3/2014 | Paladugu | H04W 36/0022 370/259 |
| 2014/0204901 | A1* | 7/2014 | Hedman | H04W 36/0022 370/331 |
| 2014/0219246 | A1* | 8/2014 | Khay-Ibbat | H04W 36/0022 370/331 |
| 2015/0373590 | A1* | 12/2015 | Ramle | H04W 36/0022 370/331 |
| 2016/0072852 | A1* | 3/2016 | Keller | H04L 65/1016 370/352 |
| 2016/0100337 | A1* | 4/2016 | Wu | H04W 36/0022 370/331 |
| 2016/0249258 | A1* | 8/2016 | Wu | H04W 36/0022 |

OTHER PUBLICATIONS

3GPP TS24.008, (2014) $3^{rd}$ Generation Partnership Project; Specification Group Core Network and Terminals; Mobile radio interface Layer 3 specification; Core network protocols; Stage 3 (Release 12).

Hauwei, China Unicom; "CSFB optimization based on SRVCC"; S2-095143, 3GPP TSG-SA WG2 Meeting #75, Discussion/Approval; (Aug. 31-Sep. 4, 2009); 12 pages; SAES-CSFB / Rel-9, Agenda 7.5; Koyto, Japan.

Intel; "SRVCC based eCSFB Solution with proper resource allocation"; S2-142461, SA WG2 Meeting #104, Approval; (Jul. 7-11); 11 pages; eCSFB/Rel-13, Agenda 7.11; Dublin, Ireland.

Extended European search report for European Application No. 15752557.7 filed Feb. 23, 2015; date of completion of the search Jun. 29, 2017; 8 pages.

Wu, "Circuit-Switched Fallback—Ultra-Flash CSFB", White Paper, (2013), 10 pages, Huawei Technologies Co., Ltd.

Vittal, "Single Radio Voice Call Continuity (SRVCC) with LTE", White Paper, (Sep. 2011), 10 pages, Radisys Corporation.

Nec et al.; "vSRVCC Cleanup"; Change Request 23.216 CR 0223, S2-114650; (Oct. 4, 2011); 21 pages; SA WG2 Meeting #87, Jeju, South Korea; V11.2.0, Rev 2.

Huawei et al.; "Ultra-Flash CSFB (SRVCC based CSFB)"; Change Request 23.272 CR 0911, S2-134316; (Nov. 4, 2013); 3 pages; SA WG2 Meeting #100, San Francisco, USA; V12.0.0, Rev1.

Huawei; "Paging Optimization using CSG information" 3GPP TSG S2-095140; (Aug. 31, 2009); 5 pages; SA2 Meeting #75; Kyoto, Japan; Rel-9.

NTT Docomo; "CSFB triggered by LCS while UE is in active VoIP session"; 3GPP TSG TD S2-103067; (May 10-14, 2010); 7 pages; SA WG2 Meeting #79, Kyoto, Japan; 23.272 CR 0218, rev 1 V9.3.0.

\* cited by examiner

CIRCUIT SWITCHED FALLBACK

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
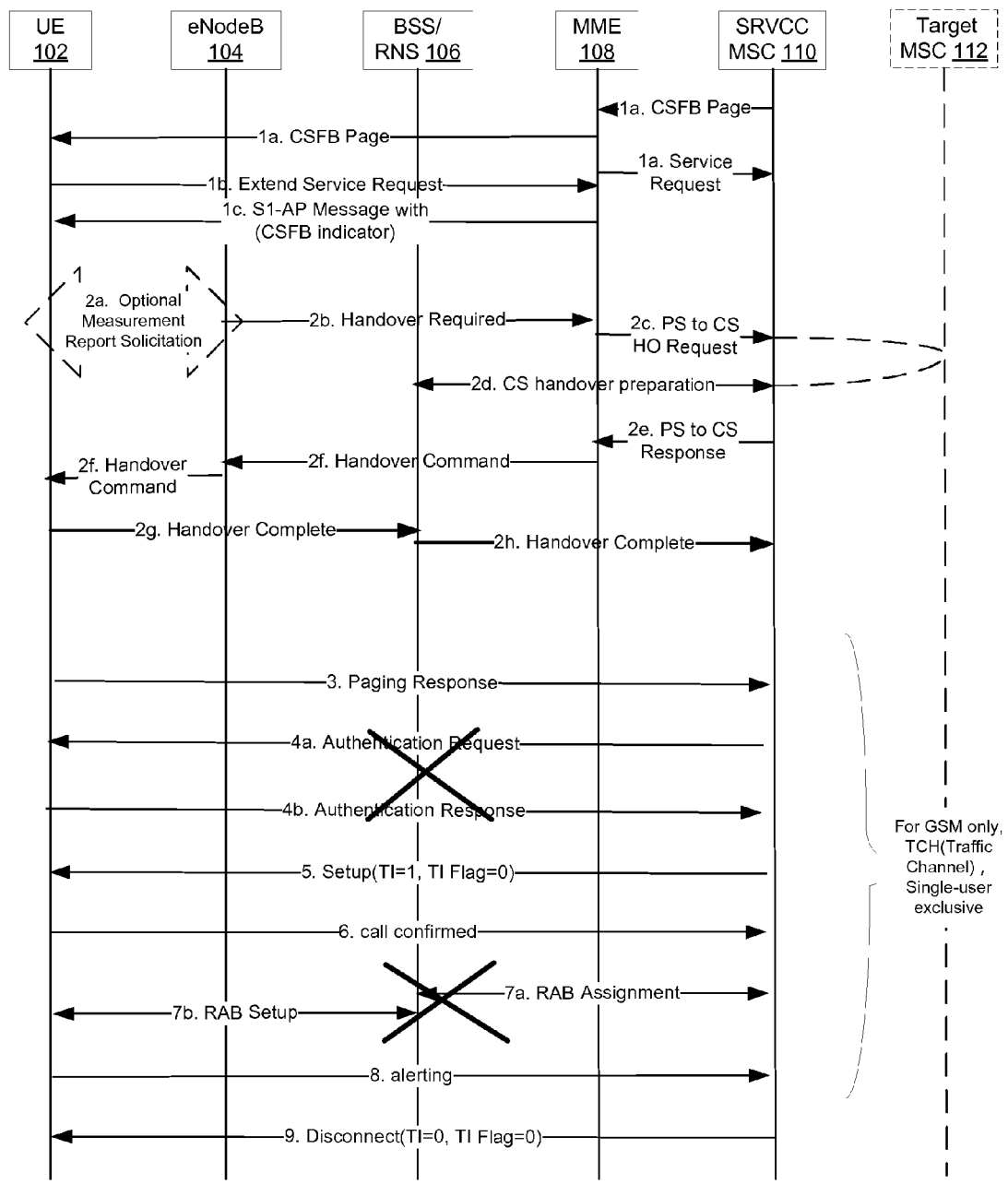
FIG. 1 illustrates a mobile terminating (MT) enhanced circuit switched fallback (eCSFB) procedure in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for facilitating circuit switched fallback (CSFB) for a user equipment (UE). A mobility management entity (MME) can receive an optimized CSFB capability indicator from the UE that defines an optimized CSFB capability of the UE. The MME can receive the optimized CSFB capability indicator from the UE via an attach request message, a tracking area update (TAU) request message, or an extended service request message. In another example, the MME can identify the optimized CSFB capability indicator based on an update location acknowledgement message that is received from a home subscriber server (HSS), the update location acknowledgement message including a UE subscriber profile that indicates the optimized CSFB capability of the UE. The optimized CSFB capability indicator can be a "0" to indicate that the UE does not support SRVCC based CSFB or a "1" to indicate that the UE does support SRVCC based CSFB. In addition, the MME can receive a requested service type associated with the UE. In one example, the MME can receive the requested service type from a mobile switching center (MSC) via a paging request message. The requested service type can be one of: voice, video, unstructured supplementary service data (USSD), location service (LCS) or unknown.

The MME can initiate a single radio voice call continuity (SRVCC) handover of the UE to a circuit switched network based on the optimized CSFB capability of the UE. The MME can send an S1 application protocol (S1-AP) request message to an evolved node B (eNB), wherein the S1-AP request message includes the optimized CSFB capability indicator and a single radio voice call continuity (SRVCC) indicator for the UE, wherein the MME selects the SRVCC indicator based on the requested service type. The SRVCC indicator notifies the eNB on whether or not to initiate the SRVCC/video SRVCC (vSRVCC), wherein the SRVCC indicator is a "0" to indicate to the eNB that no SRVCC/vSRVCC or legacy CSFB is expected, wherein the SRVCC indicator is a "1" to indicate to the eNB that SRVCC is expected, wherein the SRVCC indicator is a "2" to indicate to the eNB that vSRVCC is expected. The MME can receive a handover required message from the eNB, wherein the eNB is configured to send the handover required message to the MME when the SRVCC handover of the UE to the circuit switched network is triggered by a packet switched network based in part on the optimized CSFB capability indicator and the SRVCC indicator. A packet switched to circuit switched (PS-CS) handover procedure can be initiated even when there is no CQI=1 bearer associated with the UE.

Circuit switched fallback (CSFB) is a technology whereby voice and short message service (SMS) services are delivered to an LTE device through the use of Global System for Mobile Communications (GSM) or another circuit switched network. In other words, even though the LTE device is capable of receiving communications from a packet switched network, the LTE devices will switch back or fall back to the circuit switched network. In general, packet switched networks are newer and can provide enhanced capabilities as compared to older circuit switched networks. A packet switched network is a packet-based and all Internet Protocol (IP) network. The packets can be transmitted to a destination address and when received, the packets are reassembled to form the message. On the other hand, a circuit switched network uses dedicated point-to-point connections during voice calls. When the LTE device is traveling within a circuit switched network (as opposed to a packet switched network), the LTE device can complete voice calls by falling back to the circuit switched network (e.g., a 2G or 3G network). When the LTE device returns back to a packet switched network, the LTE device can revert back to using the packet switched network as a default. Therefore, CSFB provides LTE devices with the capability of utilizing outdated circuit switched networks when newer packet switched networks are unavailable in the LTE device's current location.

Single Radio Voice Call Continuity (SRVCC) is a scheme that enables a handover from packet data to circuit switched data voice calls. SRVCC allows packet domain calls on LTE to seamlessly be handed over to legacy circuit switched voice systems, such as GSM, universal mobile telecommunications system (UMTS) or code division multiple access (CDMA). In other words, SRVCC provides the ability to transition a voice call from a Voice over IP (VoIP) or IP Multimedia Subsystem (IMS) domain to a legacy network (e.g., a circuit switched network). Network operators utilize SRVCC to perform handover while maintaining a quality of service (QoS) and ensuring that call continuity is acceptable for emergency calls.

The handover from an LTE network to the legacy network (e.g., a circuit switched network) can occur when a mobile device moves outside an LTE coverage area. When an SRVCC-capable UE that is engaged in a voice call determines that the UE is moving away from the LTE coverage area, the UE notifies the LTE network. The LTE network determines that the voice call should be moved to the legacy network. The LTE network notifies a mobile switching center (MSC) server of the need to switch the voice call from the packet domain to the circuit domain and initiates a handover of an LTE voice bearer to the legacy network. The MSC server establishes a bearer path for the UE in the legacy network and notifies an IMS core that the UE's voice call is moving from the packet domain to the circuit domain. When the UE arrives in the legacy network, the UE switches its internal voice processing from, for example, VoIP to legacy-circuit voice and the voice call continues. When the UE arrives back to the LTE coverage area, the voice call is reverted back to LTE network in a similar manner.

In a legacy video SRVCC (vSRVCC) procedure, as defined in 3GPP Technical Specification (TS) 23.213 Section 6.2.2, radio and network resources for a UE's voice call or video call in a target radio access network (RAN) can be allocated when the MSC server receives an SRVCC packet switched (PS) to circuit switched (CS) request message. When the UE receives a handover (HO) from E-UTRAN command message, the UE knows that the radio and network resources for the voice call or video call have been reserved in the target RAN. Therefore, when the UE tunes to the target RAN, the UE can skip a radio resource allocation procedure with the target RAN, which can save time and resources during VSRVCC.

In one previous solution, when the E-UTRAN receives an S1 application protocol (S1AP) with a CSFB indicator from a mobility management entity (MME), the EUTRAN can analyze the UE's evolved packet system (EPS) bearer in order to determine whether there is a CQI=1 bearer. If there is no CQI=1 bearer, the EUTRAN does not initiate the SRVCC procedure, whereas the EUTRAN does initiate the SRVCC procedure when there is a CQI=1 bearer.

In another previous solution, an enhanced or optimized CSFB procedure that combines CSFB and SRVCC is introduced. In this solution, there is no CQI=1 EPS bearer altogether for the UE. If the EUTRAN does not know whether the UE supports the enhanced CSFB when receiving the S1-AP message (with the CSFB indicator) from the MME, the EUTRAN does not initiate the SRVCC procedure. However, in the previous solution, the network elements (e.g., the MME) do not know whether the UE supports the enhanced CSFB or only a legacy CSFB. Therefore, the present technology describes informing the network elements (e.g., the MME and eNB) of the UE's enhanced CSFB capability.

Since there is no CQI=1 bearer for the eNB in the other previous solution, the eNB can request a resource allocation for voice calls in a handover required message to the targeted RAN. The eNB can request the resource allocation for voice calls by default. In other words, the enhanced CSFB procedure in the other previous solution assumes that the SRVCC procedure is used only for voice calls and does not consider other services, such as video calls, location services (LCS) or unstructured supplementary service data (USSD). If the UE requests vSRVCC (i.e., a video call as opposed to a voice call), when the UE tunes to the target RAN, an assigned TS 11 bearer for the voice call cannot be used for the video call. In other words, the TS 11 bearer is assigned for the UE, but cannot be used anyway. In this case, the UE can sync with the target RAN for the resource allocation, but this additional signaling can waste time and radio resources. Similarly, if the UE requests LCS or USSD, the allocated TS 11 bearer is not compatible with these two kinds of services. As a result, allocating the TS 11 bearer by default in these situations is a waste of radio resource in the target RAN.

As described in further detail below, in order to alleviate incorrect resource allocation to the target RAN during the enhanced or optimized CSFB procedure (i.e., a combination of CSFB and SRVCC), the network element (e.g., the MME or eNB) can determine a requested service type for the UE. The requested service type can include voice, video, LCS or USSD. In one example, the UE can directly inform the UE of the requested service type when the enhanced CSFB procedure is supported by the UE. When the network element identifies the UE's requested service type that triggers the enhanced CSFB procedure, the network element can request the target RAN for an accurate resource allocation (i.e., a resource allocation that corresponds to the UE's requested service type). As a result, an incorrect resource allocation can be avoided (i.e., a resource allocation that is not compatible for the UE's requested service type) and the resource allocation does not have to be renegotiated after the UE tunes to the target RAN.

For mobile termination (MT) circuit switched fallback (CSFB), a mobile switching center (MSC) can identify an exact service type from incoming data or an incoming call, and does not assign an incorrect circuit switched (CS) bearer for a user equipment (UE). In a paging request message communicated from the MSC to a mobility management entity (MME), the exact service type (e.g., voice, video, USSD, LCS or unknown) can be included. Therefore, the MME can determine the exact service type that triggers the CSFB based on the paging request message received from the MSC. When the MME determines the exact service type, either a first solution for MT eCSFB or a second solution for MT eCSFB can be implemented, as described in further detail below.

In the first solution, the MME can send a S1 application protocol (S1-AP) message with a CSFB indicator to an evolved node B (eNB) after receiving the paging request message with the exact service type from the MSC. The CSFB indicator can notify the eNB that CSFB is needed for the UE. When the eNB receives the S1-AP message with the CSFB indicator from the MME, the eNB can decide whether or not to initiate the SRVCC procedure for voice according to the UE's SRVCC capability indication in a feature group indicator (FGI). The eNB can receive the FGI directly from the UE. If the UE is capable of SRVCC, the eNB can initiate the SRVCC procedure by sending a handover required message to the MME. When the MME receives the handover required message from eNB, if the requested service type is voice, the MME (also referred to as a source MME) can initiate a packet switched (PS) to circuit switched (CS) handover procedure for the voice request by sending a SRVCC PS to CS request message to the MSC. The SRVCC PS to CS request message can include an IMSI, target ID, STN-SR, C-MSISDN, source to target transparent container, MM context, emergency indication and a CSFB indicator. The MSC server can proceed with the SRVCC procedure to prepare resources for voice besides signaling. If the requested service type is video, the source MME can initiate the PS-CS handover procedure for the requested video call by sending a SRVCC PS to CS request message to the MSC. The SRVCC PS to CS request message can include an IMSI, target ID, STN-SR, C-MSISDN, source to target transparent container, MM context, CSFB indicator, and vSRVCC flag. The MSC server can proceed with the vSRVCC procedure to prepare resources for video besides signaling. If the requested service type is other than voice or video, the source MME can send a SRVCC PS to CS request message to the MSC server. The SRVCC PS to CS request message can include an IMSI, target ID, STN-SR, C-MSISDN, source to target transparent container, MM context, CSFB indicator, and non-voice-or-video. The MSC Server can proceed with an abnormal SRVCC procedure to prepare signaling resources.

In the second solution, according to the received service type in the paging request message, the MME can use a novel SRVCC indicator to notify the eNB on whether SRVCC/vSRVCC should be initiated or not. As non-limiting examples, the novel SRVCC indicator can be "0" to indicate that no SRVCC/vSRVCC or legacy CSFB is expected, a "1" to indicate that SRVCC is expected, or a "2" to indicate that vSRVCC is expected. The eNB can perform a specific action based on the SRVCC indicator included in the S1-AP message. For example, if SRVCC is expected, the eNB can initiate the SRVCC procedure, as further defined in 3GPP TS 23.216. If vSRVCC is expected, the eNB can initiate the vSRVCC procedure, as further defined in 3GPP TS 23.216. If no SRVCC/vSRVCC or legacy CSFB is expected, the eNB can proceed with the legacy CSFB, as further defined in 3GPP TS 23.272, Sections 6.2, 6.3 and 6.4. When the MME receives the handover required message from the eNB, if the requested service type is voice, the source MME can initiate the PS-CS handover procedure for the voice request by sending a SRVCC PS to CS request message to the MSC server. The SRVCC PS to CS request message can include an IMSI, target ID, STN-SR, C-MSISDN, source to target transparent container, MM context, emergency indication, and CSFB indicator. The MSC server can proceed with the SRVCC procedure in order to prepare resources for voice besides signaling. If the requested service type is video, the source MME can initiate the PS-CS handover procedure for the requested video call by sending a SRVCC PS to CS request message to the MSC server. The SRVCC PS to CS request message can include an IMSI, target ID, STN-SR, C-MSISDN, source to target transparent container, MM context, CSFB indicator, and vSRVCC flag. The MSC server can proceed with the vSRVCC procedure in order to prepare resources for video besides signaling.

FIG. 1 illustrates an exemplary mobile terminating (MT) enhanced circuit switched fallback (eCSFB) procedure. In particular, FIG. 1 can describe the first solution for MT eCSFB or the second solution for MT eCSFB as described above.

With respect to the first solution for MT eCSFB, in step 1a, a single radio voice call continuity (SRVCC) mobile switching center (MSC) 110 can send a paging request message to a mobility management entity (MME) 108 over an SGs interface. The paging request message can include a service type, such as voice, video, location services (LCS), unstructured supplementary service data (USSD), or unknown. If a user equipment (UE) 102 is in connected mode, the MME 108 can send a CS paging notification message to the UE 102. If the UE 102 is in idle mode, the MME 108 can send a paging message to each eNodeB 104 and the eNodeB 104 can forward the paging message to the UE 102.

If the UE 102 is in IDLE mode, the MME 108 can send an SGs service request message to the MSC 110 containing an indication that the UE 102 was in IDLE mode. When the MSC 110 receives the SGs service request message, the MSC 110 can stop retransmitting the SGs interface paging message.

If the UE 102 is in CONNECTED mode, the MME 108 can send the SGs service request message to the MSC 110 containing an indication that the UE 102 was in connected mode. The MSC 110 can use this connected mode indication to start the call forwarding on no reply timer for the UE 102 and the MSC 110 should send an indication of user alerting to the calling party. When the MSC 110 receives the SGs service request message, the MSC 110 can stop retransmitting the SGs interface paging message.

In step 1b, the UE 102 can send an extended service request message to the MME 108 for mobile terminating CS fallback (CSFB). The extended service request message can be encapsulated in a radio resource control (RRC) and S1 application protocol (S1-AP) messages.

In step 1c, the MME 108 can send an S1-AP request message to the eNodeB 104 that includes the CS Fallback Indicator. The CSFB indicator notifies the eNodeB 104 that CSFB is needed for the UE 102. The S1-AP request message can include an exact service type (e.g., voice, video, USSD, LCS, unknown).

In step 2a, the eNodeB 104 may optionally solicit a measurement report from the UE 102 to determine a target Universal Terrestrial Radio Access Network (UTRAN) cell or a target Global System for Mobile Communications (GSM) Enhanced Data Rates for GSM Evolution Radio Access Network (GERAN) cell to which packet switched (PS) handover is to be performed.

In step 2b, based on UE measurement reports, the CS fallback indicator in step 1c and the UE's SRVCC capability, a source E UTRAN can decide to trigger an SRVCC handover to UTRAN/GERAN by sending a handover required message to the MME 108.

In step 2c, when the MME 108 receives the handover required message from the eNB 104, if the requested service type is voice, the source MME 108 can initiate a packet switched (PS) to circuit switched (CS) handover procedure for the voice request by sending a SRVCC PS to CS request message to the MSC server 110. The SRVCC PS to CS request message can include an international mobile subscriber identity (IMSI), a target identifier (ID), a session transfer number for SRVCC (STN-SR), a correlation mobile station integrated services digital network (ISDN) number (C-MSISDN), a source to target transparent container, an MM context, an emergency indication, and a CSFB indicator. If the requested service type is video, the source MME 108 can initiate the PS-CS handover procedure for the requested video call by sending a SRVCC PS to CS request message to the MSC server 110. The SRVCC PS to CS request message can include an IMSI, target ID, STN-SR, C-MSISDN, source to target transparent container, MM context, CSFB indicator, and vSRVCC flag.

If the requested service type is other than voice or video, the source MME 108 can send a SRVCC PS to CS request message to the MSC server 110. The SRVCC PS to CS request message can include an IMSI, target ID, STN-SR, C-MSISDN, source to target transparent container, MM context, CSFB indicator, and non-voice-or-video. The MME 108 does not need to delete a QCI=1 bearer as the SRVCC procedure is due to CSFB and there is no QCI=1 bearer.

In step 2d, when the MSC server 110 receives the SRVCC PS to CS request message, the MSC server 110 can identify the service type that triggers the eCSFB. If the service type is voice, the MSC server 110 can proceed with the SRVCC procedure to prepare resources for voice. If the service type is video, the MSC server 110 can proceed with the vSRVCC procedure to prepare resources for video besides signaling. If the service type is for non-voice-or-video, the MSC server 110 can proceed with an abnormal SRVCC procedure to prepare only signaling resources. As the SRVCC is due to the CSFB, the SRVCC MSC 110 does not initiate a session transfer procedure to the IMS and only triggers a legacy CS handover preparation. If the SRVCC MSC 110 is not a target MSC 112, then the SRVCC MSC 110 can interwork the PS-CS handover request with a CS inter MSC handover request by sending a prepare handover request message to the target MSC 112.

In step 2e, the MSC server 110 can send a SRVCC PS to CS response (target to source transparent container) message to the source MME 108.

In step 2f, the source MME 108 can send a handover command (target to source transparent container) message to the source E-UTRAN (or eNodeB 104) and then to the UE 102. The handover command message can include information about the voice component.

In step 2g, the UE 102 can send a relocation/handover complete message to a base station system (BSS)/radio network subsystem (RNS) 106.

In step 2h, the BSS/RNS 106 can forward the relocation/handover complete message to the SRVCC MSC 110.

In step 3, the UE 102 can send a paging response message to the MSC 110.

In step 4, the MSC 110 can skip the authentication procedure as the UE 102 and the MME 108, respectively, generate the CS security context during the SRVCC procedure. In other words, the MSC 110 does not have to send an authentication request message to the UE 102, and the UE 102 does not have to send an authentication response message to the MSC 110.

In step 5, after receiving the relocation/handover complete message from the RNS/BSS 106 in step 2h, the applicable CS call procedures continues. As further described in 3GPP TS 24.008, the UE 102 can generate a call instance for SRVCC with TI=0, which is similar to a terminated call instance during a SRVCC HO procedure, i.e., the call instance is with TI=0 and TI Flag=1. In order to avoid a collision at the UE side, the MSC 110 can send a setup message with TI=1 and TI Flag=0, as opposed to a setup message with TI=0 and TI Flag=0.

In step 6, the UE 102 can send a call confirmed message to the MSC 110.

In step 7, as the CS radio access bearer (RAB) is already pre-allocated during a SRVCC handover preparation procedure, the MSC 110 can skip the CS RAB assignment procedure. In other words, the MSC 110 does not have to perform a RAB assignment with the BSS/RNS 106, and the BSS/RNS 106 does not have to perform a RAB setup with the UE 102.

In step 8, the UE 102 can send an alerting message to the MSC 110.

In step 9, the MSC 110 can send a disconnect message (TI=0, TI Flag=0) to release a dummy call instance created during the SRVCC procedure.

With respect to the second solution for MT eCSFB, in step 1a, the MSC 110 can send a paging request message to the MME 108 over an SGs interface. The paging request message can include the service type (e.g., voice, video, USSD, LCS, unknown). If the UE 102 is in connected mode, the MME 108 can send a CS paging notification message to the UE 102. If the UE 102 is in idle mode, the MME 108 can send a paging message to each eNodeB 104 and the eNodeB 104 can forward the paging message to the UE 102.

If the UE 102 is in IDLE mode, the MME 108 can send an SGs service request message to the MSC 110 containing an indication that the UE 102 was in IDLE mode. When the MSC 110 receives the SGs service request message, the MSC 110 can stop retransmitting the SGs interface paging message.

If the UE 102 is in CONNECTED mode, the MME 108 can send the SGs service request message to the MSC 110 containing an indication that the UE 102 was in connected mode. The MSC 110 can use this connected mode indication to start the call forwarding on no reply timer for the UE 102 and the MSC 110 should send an indication of user alerting to the calling party. When the MSC 110 receives the SGs service request message, the MSC 110 can stop retransmitting the SGs interface paging message.

In step 1b, the UE 102 can send an extended service request message to the MME 108 for mobile terminating CS fallback (CSFB). The extended service request message can be encapsulated in a radio resource control (RRC) and S1 application protocol (S1-AP) messages.

In step 1c, the MME 108 can send an S1-AP request message to the eNodeB 104 that includes the CS fallback indicator.

According to the received service type in the paging request message, the MME 108 can use a novel SRVCC indicator to notify the eNodeB 104 on whether SRVCC/vSRVCC should be initiated or not. As non-limiting examples, the novel SRVCC indicator can be "0" to indicate that no SRVCC/vSRVCC or legacy CSFB is expected, a "1" to indicate that SRVCC is expected, or a "2" to indicate that vSRVCC is expected. The eNodeB 104 can perform a specific action based on the SRVCC indicator included in the S1-AP message. For example, if SRVCC is expected, the eNodeB 104 can initiate the SRVCC procedure, as further defined in 3GPP TS 23.216. If vSRVCC is expected, the eNodeB 104 can initiate the vSRVCC procedure, as further defined in 3GPP TS 23.216. If no SRVCC/vSRVCC or legacy CSFB is expected, the eNodeB 104 can proceed with the legacy CSFB, as further defined in 3GPP TS 23.272, Sections 6.2, 6.3 and 6.4.

In step 2a, the eNodeB 104 may optionally solicit a measurement report from the UE 102 to determine a target GERAN/UTRAN cell to which packet switched (PS) handover is to be performed.

In step 2b, based on UE measurement reports, the CS fallback indicator in step 1c, and the UE's SRVCC capability, a source E UTRAN (or eNodeB 104) can decide to trigger an SRVCC handover of the UE 102 to the UTRAN/GERAN by sending a handover required message to the MME 108.

In step 2c, when the MME 108 receives the handover required message from the eNB 104, if the requested service type is voice, the source MME 108 can initiate the PS-CS handover procedure for the voice request by sending a SRVCC PS to CS request message to the MSC server 110. The SRVCC PS to CS request message can include an IMSI, target ID, STN-SR, C-MSISDN, source to target transparent container, MM context, emergency indication, and CSFB indicator. The MSC server 110 can proceed with the SRVCC procedure to prepare resources for voice besides signaling. If the requested service type is video, the source MME 108 can initiate the PS-CS handover procedure for the requested video call by sending a SRVCC PS to CS request message to the MSC server 110. The SRVCC PS to CS request message can include an IMSI, target ID, STN-SR, C-MS ISDN, source to target transparent container, MM context, CSFB indicator, and vSRVCC flag. Then MSC server 110 can proceed with the vSRVCC procedure to prepare resources for video besides signaling. The MME 108 does not need to delete a QCI=1 bearer as the SRVCC procedure is due to CSFB and there is no QCI=1 bearer.

In step 2d, when the MSC server 110 receives the SRVCC PS to CS request message, the MSC server 110 can identify the service type that triggers the eCSFB. If the service type is voice, the MSC server 110 can proceed with the SRVCC procedure to prepare resources for voice. If the service type is video, the MSC server 110 can proceed with the vSRVCC procedure to prepare resources for video besides signaling. As the SRVCC is due to the CSFB, the SRVCC MSC 110 does not initiate a session transfer procedure to the IMS and only triggers a legacy CS handover preparation. If the SRVCC MSC 110 is not a target MSC 112, then the SRVCC MSC 110 can interwork the PS-CS handover request with a CS inter MSC handover request by sending a prepare handover request message to the target MSC 112.

Steps 2e to 9 in FIG. 1 are similar to the description of steps 2e to 9 provided above.

For mobile originating (MO) circuit switched fallback (CSFB), when a mobility management entity (MME) knows an exact service type that triggers the CSFB from a user equipment (UE) in an extended service request message, either a first solution for MO eCSFB or a second solution for MO eCSFB can be implemented, as described in further detail below.

In the first solution, the MME can send an S1 application protocol (S1-AP) message with a CSFB indicator to an evolved node B (eNB) after receiving the extended service request message with the exact service type. When the eNB receives the S1-AP message with the CSFB indicator, the eNB can decide whether or not to initiate the SRVCC procedure for voice according to the UE's SRVCC capability indication in a feature group indicator (FGI). The eNB can receive the FGI directly from the UE. If the UE is capable of SRVCC, the eNB can initiate the SRVCC procedure by sending a handover required message to the MME. When the MME receives the handover required message from the eNB, if the requested service type is voice, the source MME can initiate a packet switched (PS) to circuit switched (CS) handover procedure for the voice request by sending a SRVCC PS to CS request message to a mobile switching center (MSC) server. The SRVCC PS to CS request message can include an IMSI, target ID, STN-SR, C-MS ISDN, source to target transparent container, MM context, emergency indication, and CSFB indicator. The MSC server can proceed with the SRVCC procedure to prepare resources for voice besides signaling. If the requested service type is video, the source MME can initiate the PS-CS handover procedure for the requested video call by sending a SRVCC PS to CS request message to the MSC server. The SRVCC PS to CS request message can include an IMSI, target ID, STN-SR, C-MSISDN, source to target transparent container, MM context, CSFB indicator, and vSRVCC flag. The MSC server can proceed with the vSRVCC procedure to prepare resources for video besides signaling. If the requested service type is other than voice or video, the source MME can send a SRVCC PS to CS request message to the MSC server. The a SRVCC PS to CS request message can include an IMSI, target ID, STN-SR, C-MSISDN, source to target transparent container, MM context, CSFB indicator, and non-voice-or-video. The MSC server can proceed with an abnormal SRVCC procedure to prepare only signaling resources.

In the second solution, according to the received service type, the MME can use a novel SRVCC indicator to notify the eNB on whether SRVCC/vSRVCC should be initiated or not. As non-limiting examples, the novel SRVCC indicator can be "0" to indicate that no SRVCC/vSRVCC or legacy CSFB is expected, a "1" to indicate that SRVCC is expected, or a "2" to indicate that vSRVCC is expected. The eNB can perform a specific action based on the SRVCC indicator included in the S1-AP message. For example, if SRVCC is expected, the eNB can initiate the SRVCC procedure, as further defined in 3GPP TS 23.216. If vSRVCC is expected, the eNB can initiate the vSRVCC procedure, as further defined in 3GPP TS 23.216. If no SRVCC/vSRVCC or legacy CSFB is expected, the eNB can proceed with the legacy CSFB, as further defined in 3GPP TS 23.272, Sections 6.2, 6.3 and 6.4. When the MME receives the handover required message from eNB, if the requested service type is voice, the source MME can initiate the PS-CS handover procedure for the voice request by sending a SRVCC PS to CS request message to the MSC server. The SRVCC PS to CS request message can include an IMSI, target ID, STN-SR, C-MSISDN, source to target transparent container, MM context, emergency indication, and CSFB indicator. The MSC server can proceed with the SRVCC procedure to prepare resources for voice besides signaling. If the requested service type is video, the source MME can initiate the PS-CS handover procedure for the requested video call by sending a SRVCC PS to CS request message to the MSC server. The SRVCC PS to CS request message can include an IMSI, target ID, STN-SR, C-MSISDN, source to target transparent container, MM context, CSFB indicator, and vSRVCC flag. The MSC server can proceed with the vSRVCC procedure to prepare resources for video besides signaling.

In mobile originating (MO) eCSFB, the UE can send the extended service request message with the service type to the MME. The MME can send a S1-AP request message with an SRVCC indicator. The S1-AP message can indicate to the eNB that the UE should be moved to the UTRAN/GERAN. When the eNB receives the S1AP request message, the eNB can perform one of two actions. If the UE indicates a SRVCC capability in a FGI and the SRVCC indicator from the MME does not only indicate a legacy CSFB, the eNB can initiate a SRVCC/vSRVCC procedure even though there is no CQI=1 bearer for the eNB. If the UE indicates a SRVCC capability in a FGI but the SRVCC indicator from the MME only indicates a legacy CSFB, the eNB does not initiate a SRVCC/vSRVCC procedure, but rather proceeds with a legacy CSFB procedure, as defined in TS 23.272. For SRVCC, as there is no CQI=1 bearer for the CSFB triggered procedure, there is no need for the MME to delete a CQI=1 bearer. For vSRVCC, as there is no CQI=1 bearer and vSRVCC marked PS bearer for the CSFB triggered procedure, there is no need for the MME to delete a CQI=1 bearer and the vSRVCC marked PS bearer.

Figure 2:
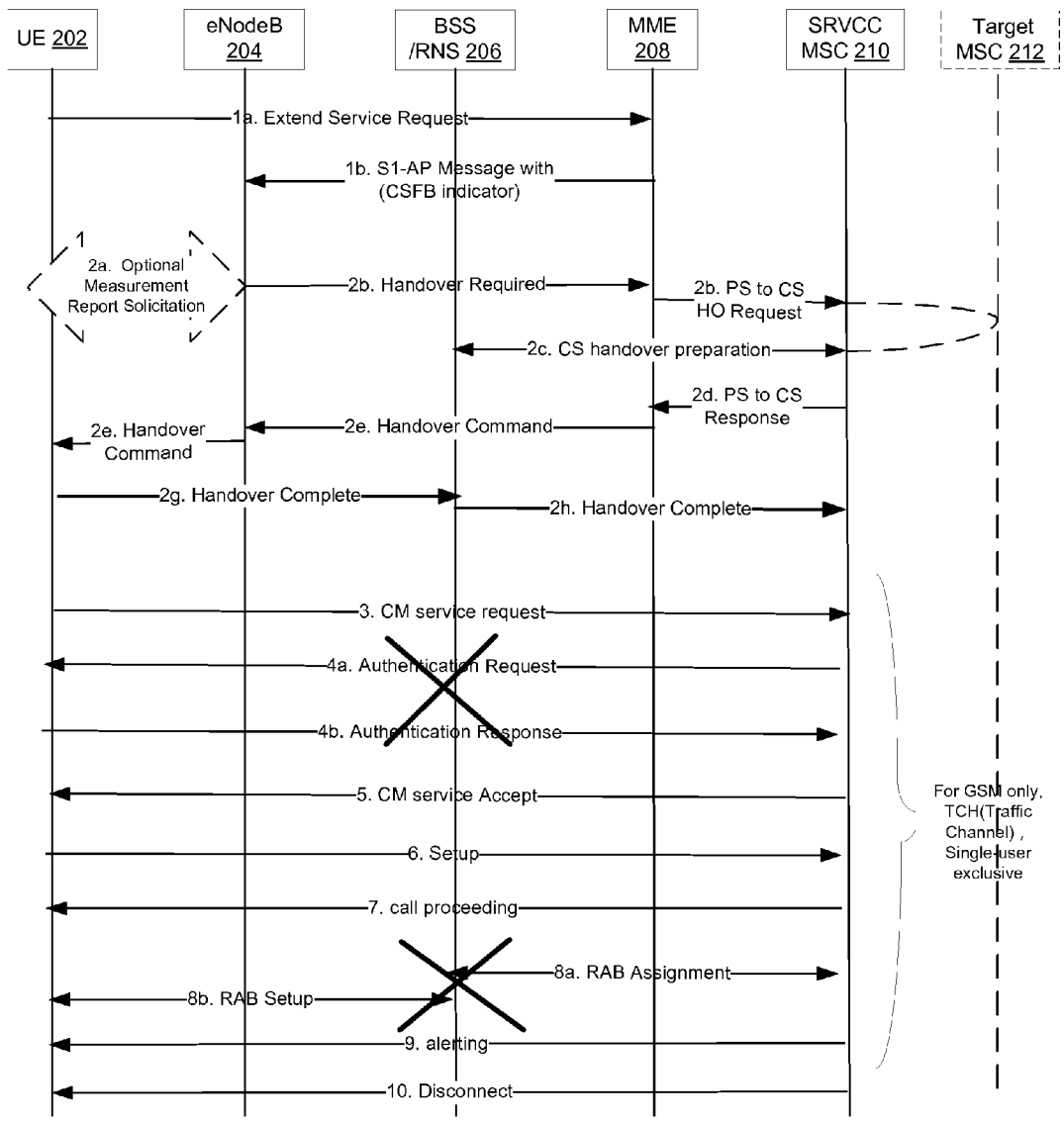
FIG. 2 illustrates a mobile originating (MO) enhanced circuit switched fallback (eCSFB) procedure in accordance with an example.

FIG. 2 illustrates an exemplary mobile originating (MO) enhanced circuit switched fallback (eCSFB) procedure. In particular, FIG. 2 can describe the first solution for MO eCSFB or the second solution for MO eCSFB as described above.

With respect to the first solution for MO eCSFB, in step 1a, a user equipment (UE) 202 can send an extended service request message to a mobile management entity (MME) 208 for mobile originating CS Fallback. The extended service request message can include a service type, such as voice, video, location services (LCS), unstructured supplementary service data (USSD), or unknown.

In step 1b, the MME 208 can send an S1-AP Request message to an eNodeB 204 that includes a CS fallback indicator.

In step 2a, the eNodeB 204 may optionally solicit a measurement report from the UE 202 to determine a target GERAN/UTRAN cell to which packet switched (PS) handover is to be performed.

In step 2b, based on UE measurement reports, the CS fallback indicator in step 1b and the UE's SRVCC capability, a source E UTRAN can decide to trigger an SRVCC handover to UTRAN/GERAN by sending a handover required message to the MME 208.

In step 2c, when the MME 208 receives the handover required message from the eNB 204, if the requested service type is voice, the source MME 208 can initiate a packet switched (PS) to circuit switched (CS) handover procedure for the voice request by sending a SRVCC PS to CS request message to the MSC server 210. The SRVCC PS to CS request message can include an international mobile subscriber identity (IMSI), a target identifier (ID), a session transfer number for SRVCC (STN-SR), a correlation mobile station integrated services digital network (ISDN) number (C-MSISDN), a source to target transparent container, an MM context, an emergency indication, and a CSFB indicator. If the requested service type is video, the source MME 208 can initiate the PS-CS handover procedure for the requested video call by sending a SRVCC PS to CS request message to the MSC server 210. The SRVCC PS to CS request message can include an IMSI, target ID, STN-SR, C-MSISDN, source to target transparent container, MM context, CSFB indicator, and vSRVCC flag. If the requested service type is other than voice or video, the source MME 208 can send a SRVCC PS to CS request message to the MSC server 210. The SRVCC PS to CS request message can include an IMSI, target ID, STN-SR, C-MSISDN, source to target transparent container, MM context, CSFB indicator, and non-voice-or-video. The MME 208 does not need to delete a QCI=1 bearer as the SRVCC procedure is due to CSFB and there is no QCI=1 bearer.

In step 2d, when the MSC server 210 receives the SRVCC PS to CS request message, the MSC server 210 can identify the service type that triggers the eCSFB. If the service type is voice, the MSC server 210 can proceed with the SRVCC procedure to prepare resources for voice. If the service type is video, the MSC server 210 can proceed with the vSRVCC procedure to prepare resources for video besides signaling. If the service type is for non-voice-or-video, the MSC server 210 can proceed with an abnormal SRVCC procedure to prepare only signaling resources. As the SRVCC is due to the CSFB, the SRVCC MSC 210 does not initiate a session transfer procedure to the IMS and only triggers a legacy CS handover preparation. If the SRVCC MSC 210 is not a target MSC 212, then the SRVCC MSC 210 can interwork the PS-CS handover request with a CS inter MSC handover request by sending a prepare handover request message to the target MSC 212.

In step 2e, the source MME 208 can send a handover command (target to source transparent container) message to the source E-UTRAN (or eNodeB 204) and then to the UE 202. The handover command message can include information about the voice component.

In step 2g, the UE 202 can send a relocation/handover complete message to a base station system (BSS)/radio network subsystem (RNS) 206.

In step 2h, the BSS/RNS 206 can forward the relocation/handover complete message to the SRVCC MSC 210.

In step 3, the UE 202 can send a CM service request message to the MSC 210.

In step 4, the MSC 210 can skip the authentication procedure as the UE 202 and the MME 208, respectively, generate the CS security context during the SRVCC procedure. In other words, the MSC 210 does not have to send an authentication request message to the UE 202, and the UE 202 does not have to send an authentication response message to the MSC 210.

In step 5, the UE 202 can receive a CM service accept message from the MSC 210, and the UE 202 can subsequently proceed with CS call procedures.

In step 6, the UE 202 can proceed a with CS call procedure by sending a setup message with TI=0 and TI Flag=0 to the MSC 210. As further described in 3GPP TS 24.008, the UE 202 can generate a call instance for SRVCC with TI=0, which is similar to a terminated call instance during a SRVCC HO procedure, i.e., the call instance is with TI=0 and TI Flag=1.

In step 7, the MSC 210 can send a call proceeding message to the UE 202.

In step 8, as the CS radio access bearer (RAB) is already pre-allocated during a SRVCC handover preparation procedure, the MSC 110 can skip the CS RAB assignment procedure. In other words, the MSC 210 does not have to perform a RAB assignment with the BSS/RNS 206, and the BSS/RNS 206 does not have to perform a RAB setup with the UE 202.

In step 9, the MSC 210 can send an alerting message to the UE 202.

In step 10, the MSC 210 can send a disconnect message (TI=0, TI Flag=0) to release a dummy call instance created during the SRVCC procedure.

With respect to the second solution for MO eCSFB, in step 1a, the UE 202 can send an extended service request message to the MME 208 for mobile originating CS Fallback. The extended service request message can include an exact service type (e.g., voice, video, USSD, LCS, unknown).

In step 1b, the MME 208 can send an S1-AP Request message to the eNodeB 204 that includes the CS fallback indicator. According to the received service type, the MME 208 can use a novel SRVCC indicator to notify the eNodeB 204 on whether SRVCC/vSRVCC should be initiated or not. As non-limiting examples, the novel SRVCC indicator can be "0" to indicate that no SRVCC/vSRVCC or legacy CSFB is expected, a "1" to indicate that SRVCC is expected, or a "2" to indicate that vSRVCC is expected. The eNodeB 204 can perform a specific action based on the SRVCC indicator included in the S1-AP message. For example, if SRVCC is expected, the eNodeB 204 can initiate the SRVCC procedure, as further defined in 3GPP TS 23.216. If vSRVCC is expected, the eNodeB 204 can initiate the vSRVCC procedure, as further defined in 3GPP TS 23.216. If no SRVCC/vSRVCC or legacy CSFB is expected, the eNodeB 204 can proceed with the legacy CSFB, as further defined in 3GPP TS 23.272, Sections 6.2, 6.3 and 6.4.

In step 2a, the eNodeB 204 may optionally solicit a measurement report from the UE 202 to determine a target GERAN/UTRAN cell to which packet switched (PS) handover is to be performed.

In step 2b, based on UE measurement reports, the CS fallback indicator in step 1b and the UE's SRVCC capability in a feature group indicator (FGI), a source E UTRAN can decide to trigger an SRVCC or vSRVCC handover to the UTRAN/GERAN by sending a handover required message to the MME 208.

In step 2c, when the MME 208 receives the handover required message from the eNB 204, if the requested service type is voice, the source MME 208 can initiate a packet switched (PS) to circuit switched (CS) handover procedure for the voice request by sending a SRVCC PS to CS request message to the MSC server 210. The SRVCC PS to CS request message can include an international mobile subscriber identity (IMSI), a target identifier (ID), a session transfer number for SRVCC (STN-SR), a correlation mobile station integrated services digital network (ISDN) number (C-MSISDN), a source to target transparent container, an MM context, an emergency indication, and a CSFB indicator. If the requested service type is video, the source MME 208 can initiate the PS-CS handover procedure for the requested video call by sending a SRVCC PS to CS request message to the MSC server 210. The SRVCC PS to CS request message can include an IMSI, target ID, STN-SR, C-MSISDN, source to target transparent container, MM context, CSFB indicator, and vSRVCC flag. The MSC server 210 can proceed with the vSRVCC procedure to prepare resources for video besides signaling. The MME 208 does not need to delete a QCI=1 bearer as the SRVCC procedure is due to CSFB and there is no QCI=1 bearer.

In step 2d, when the MSC server 210 receives the SRVCC PS to CS request message, the MSC server 210 can identify the service type that triggers the eCSFB. If the service type is voice, the MSC server 210 can proceed with the SRVCC procedure to prepare resources for voice. If the service type is video, the MSC server 210 can proceed with the vSRVCC procedure to prepare resources for video besides signaling. As the SRVCC is due to the CSFB, the SRVCC MSC 110 does not initiate a session transfer procedure to the IMS and only triggers a legacy CS handover preparation. If the SRVCC MSC 210 is not a target MSC 212, then the SRVCC MSC 210 can interwork the PS-CS handover request with a CS inter MSC handover request by sending a prepare handover request message to the target MSC 212.

Steps 2e to 10 in FIG. 2 are similar to the description of steps 2e to 10 provided above.

Figure 3:
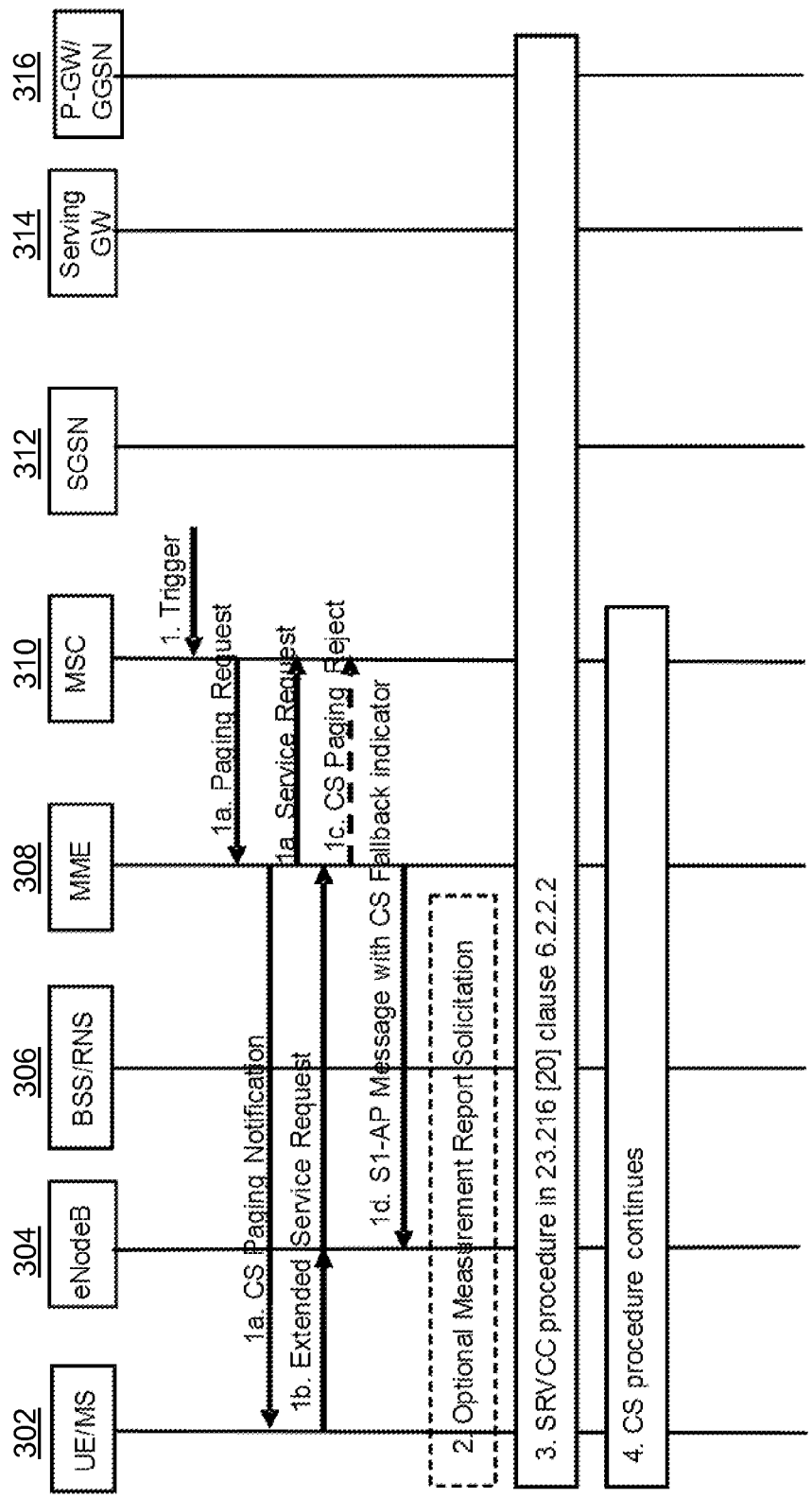
FIG. 3 illustrates an enhanced circuit switched fallback (CSFB) procedure that includes a single radio voice call continuity (SRVCC) procedure in accordance with an example.

FIG. 3 illustrates an exemplary enhanced circuit switched fallback (CSFB) procedure that includes a single radio voice call continuity (SRVCC) procedure. In other words, the enhanced CSFB procedure combines CSFB with SRVCC. In particular, FIG. 3 describes several techniques in which a UE's enhanced CSFB capability is communicated to various network elements, such as the eNB and MME. When the UE supports the enhanced CSFB capability, an EUTRAN can initiate a SRVCC procedure when receiving an S1AP message with a CS fallback indicator from an MME. An indication of the UE's support for the enhanced CSFB capability can be included in the S1AP message. If the S1AP message indicates that the UE does not support the enhanced CSFB capability, then the eNB does not initiate the SRVCC procedure. In the enhanced CSFB case, there is no CQI=1 bearer for the UE in the E-UTRAN. For example, in a first technique, the UE's enhanced CSFB capability is communicated to the network elements via an extended service request message. In a second technique, the UE's enhanced CSFB capability is determined based on the UE's subscription profile. In a third technique, the UE's enhanced CSFB capability is communicated to the network elements via a non-access stratum (NAS) message. In a fourth technique, the UE's enhanced CSFB capability is determined via a feature group indicator (FGI).

With respect to FIG. 3 and the first technique, in step 1, a mobile switching center (MSC) 310 or a visitor location register (VLR) can receive a trigger for a network-initiated circuit switched (CS) procedure.

In step 1a, the MSC 310 can respond by sending a paging request message to a mobility management entity (MME) 308 over a SGs interface. For a call independent supplementary service, the paging request message can include an SS service ID. If the MME 308 did not return an "SMS-only" indication to the UE 302 during an attach or combined tracking area (TA) or location area (LA) update procedure, the MME 308 can send a paging message to the UE 302.

For the call independent supplementary service, the paging request message can include the SS service ID. The SS service ID can be used to indicate a type of supplementary service to the UE. The SS service ID can be included in the paging request message when the UE 302 is in active mode.

If the MME 308 returned the "SMS-only" indication to the UE 302 during an attach or combined tracking area (TA) or location area (LA) update procedure, the MME 308 does not send the paging message to the UE 302, and the MME 308 sends a CS paging reject message to the MSC 310 to stop a CS paging procedure, thereby stopping the CSFB procedure.

If the UE 302 is in connected mode, the MME 308 can send a CS paging notification message to the UE 302. If the UE 302 is in idle mode, the MME 308 can send a paging message to each eNodeB 304, and the eNodeB 304 can forward the paging message to the UE 302.

In step 1b, the UE 302 can send an extended service request message (with a reject or accept) to the MME 308 for mobile terminating CS fallback. The extended service request message can be encapsulated in radio resource control (RRC) and S1-AP messages. The extended service request message can include an enhanced CSFB indicator if the UE supports this feature (i.e., if the UE supports the enhanced CSFB).

In step 1c, upon receiving the extended service request (with a reject) for mobile terminating CS fallback with the enhanced CSFB indicator, the MME 308 can send a paging reject message to the MSC 310 to stop the CS paging procedure, thereby stopping the CSFB procedure.

In step 1d, the MME 308 can send an S1-AP Request message to the eNodeB 304 that includes the UE radio capabilities and an enhanced CS fallback indicator. This S1-AP Request message can indicate to the eNodeB 304 that the UE 302 is to be moved to the UTRAN/GERAN.

In step 1e, the eNodeB 304 can reply with a S1-AP response message.

In step 2, optional measurement report and solicitation steps can be performed, as further defined in 3GPP TS 23.272. These steps are further defined in clause 7.3 for a PS handover supported case and clause 7.4 for a no PS handover supported case.

In step 3, based on UE measurement reports, the enhanced CS fallback indicator, and the UE's SRVCC capability in step 1d, a source E UTRAN (or eNodeB 304) can decide to trigger an SRVCC handover of the UE to the UTRAN/GERAN. If the UE 302 does not support SRVCC, then a legacy CSFB procedure can be performed.

The E-UTRAN can trigger the SRVCC handover to UTRAN/GERAN for CSFB when there is no QCI=1 bearer and no vSRVCC marked video bearer. The MME 308 can send a SRVCC PS to CS request message with a CSFB indication that SRVCC is due to CSFB. The MME 308 does not need to perform bearer splitting from other PS bearers. The MME 308 does not delete a QCI=1 bearer and the vSRVCC marked video bearer, as the SRVCC procedure is due to CSFB and there is no QCI=1 bearer and the vSRVCC marked video bearer. As the SRVCC is due to CSFB, the MSC 310 does not initiate a session transfer procedure and only triggers a legacy CS handover preparation.

In step 4, after receiving a relocation/handover complete message from the RNS/BSS 306 in step 3, the CS procedure can continue.

With respect to FIG. 3 and the second technique, the MME 308 can determine the UE's enhanced CSFB capability based on the UE's subscription profile. The MME 308 can receive the subscription profile from a home subscriber server (HSS). In one example, the subscription profile can be included in an updated location acknowledgement message, as further defined in 3GPP TS 23.401 Section 5.3.2.1. In another example, the UE's enhanced CSFB capability can be provided to the MME 308 during an attach procedure.

In step 1, the MSC 310 or VLR can receive a trigger for a network-initiated circuit switched (CS) procedure.

In step 1a, the MSC 310 can respond by sending a paging request message to the MME 308 over a SGs interface.

In step 1b, the UE 302 can send an extended service request message (with a reject or accept) to the MME 308 for mobile terminating CS fallback. The extended service request message can be encapsulated in radio resource control (RRC) and S1-AP messages.

In step 1c, upon receiving the extended service request (with a reject) for mobile terminating CS fallback, the MME 308 can send a paging reject message to the MSC 310 to stop the CS paging procedure, thereby stopping the CSFB procedure.

In step 1d, the MME 308 can send an S1-AP request message to the eNodeB 304 that includes the UE radio capabilities and an enhanced CS fallback indicator for the UE. As previously explained, the MME 308 can previously determine the enhanced CS fallback indicator based on the UE's subscription profile that was received from the HSS. This S1-AP Request message can indicate to the eNodeB 304 that the UE 302 is to be moved to the UTRAN/GERAN.

In step 1e, the eNodeB 304 can reply with a S1-AP response message.

Steps 2, 3 and 4 in FIG. 3 are as previously described.

With respect to FIG. 3 and the third technique, the MME 308 can determine the UE's enhanced CSFB capability based on an attach request message or a tracking area update (TAU) message received at the MME 308. In other words, the MME 308 can receive a UE network capability in a NAS message during an attach or TAU procedure, and the UE network capability can indicate the UE's enhanced CSFB capability. In one example, the NAS message can include a "1" to indicate that the UE 302 supports the enhanced CSFB or a "0" to indicate that the UE 302 does not support the enhanced CSFB. The attach procedure is further defined in 3GPP TS 23.401 Section 5.3.2.1, and the tracking area update (TAU) procedure is further defined in 3GPP TS 23.401 Section 5.3.3.1.

In step 1, the MSC 310 or VLR can receive a trigger for a network-initiated circuit switched (CS) procedure.

In step 1a, the MSC 310 can respond by sending a paging request message to the MME 308 over a SGs interface.

In step 1b, the UE 302 can send an extended service request message (with a reject or accept) to the MME 308 for mobile terminating CS fallback. The extended service request message can be encapsulated in radio resource control (RRC) and S1-AP messages.

In step 1c, upon receiving the extended service request (with a reject) for mobile terminating CS fallback, the MME 308 can send a paging reject message to the MSC 310 to stop the CS paging procedure, thereby stopping the CSFB procedure.

In step 1d, the MME 308 can send an S1-AP request message to the eNodeB 304 that includes the UE radio capabilities and an enhanced CS fallback indicator for the UE. The enhanced CS fallback indicator can be included in the S1-AP request message if the enhanced CS fallback indicator in the UE network capability is set to true. As previously explained, the MME 308 can previously determine the enhanced CS fallback indicator based on the NAS message receiving from the UE 302 during the attach procedure or TAU procedure. This S1-AP Request message can indicate to the eNodeB 304 that the UE 302 is to be moved to the UTRAN/GERAN.

In step 1e, the eNodeB 304 can reply with a S1-AP response message.

Steps 2, 3 and 4 in FIG. 3 are as previously described.

With respect to FIG. 3 and the fourth technique, the eNodeB 304 can determine the UE's enhanced CSFB capability based on a feature group indicator (FGI) received from the UE 302. In another example, the UE's enhanced CSFB capability can be included in UE radio access capability parameters provided to the eNodeB 304 from the UE 302. The eNodeB 304 can provide the UE's enhanced CSFB capability to the MME 308. The feature group indicators (FGI) and the UE-EUTRA capability are further defined in 3GPP TS 36.331 Section B.1.

In step 1, the MSC 310 or VLR can receive a trigger for a network-initiated circuit switched (CS) procedure.

In step 1a, the MSC 310 can respond by sending a paging request message to the MME 308 over a SGs interface.

In step 1b, the UE 302 can send an extended service request message (with a reject or accept) to the MME 308 for mobile terminating CS fallback. The extended service request message can be encapsulated in radio resource control (RRC) and S1-AP messages.

In step 1c, upon receiving the extended service request (with a reject) for mobile terminating CS fallback, the MME 308 can send a paging reject message to the MSC 310 to stop the CS paging procedure, thereby stopping the CSFB procedure.

In step 1d, the MME 308 can send an S1-AP request message to the eNodeB 304 that includes the UE radio capabilities. The S1-AP Request message can indicate to the eNodeB 304 that the UE 302 is to be moved to the UTRAN/GERAN.

In step 1e, the eNodeB 304 can reply with a S1-AP response message.

In step 2, optional measurement report and solicitation steps can be performed, as further defined in 3GPP TS 23.272. These steps are further defined in clause 7.3 for a PS handover supported case and clause 7.4 for a no PS handover supported case.

In step 3, based on UE measurement reports, the enhanced CS fallback indicator, and the UE's SRVCC capability in step 1d, a source E UTRAN (or eNodeB 304) can decide to trigger an SRVCC handover of the UE to the UTRAN/GERAN. As previously explained, the eNodeB 304 can determine the enhanced CS fallback indicator based on the FGI received from the UE 302. In other words, in this case, the eNodeB 304 can receive the enhanced CS fallback indicator from the UE 302 rather than the MME 308.

The E-UTRAN can trigger the SRVCC handover to UTRAN/GERAN for CSFB when there is no QCI=1 bearer and no vSRVCC marked video bearer. A handover required message communicated from the eNB 304 to the MME 308 can include an indicator for enhanced CSFB capability, wherein the MME 308 interprets the indicator as SRVCC due to CSFB. The MME 308 can send a SRVCC PS to CS request message with a CSFB indication that SRVCC is due to CSFB. The MME 308 does not need to perform bearer splitting from other PS bearers. The MME 308 does not delete a QCI=1 bearer and the vSRVCC marked video bearer, as the SRVCC procedure is due to CSFB and there is no QCI=1bearer and the vSRVCC marked video bearer. As the SRVCC is due to CSFB, the MSC 310 does not initiate a session transfer procedure and only triggers a legacy CS handover preparation.

In step 4, after receiving a relocation/handover complete message from the RNS/BSS 306 in step 3, the CS procedure can continue.

Figure 4:
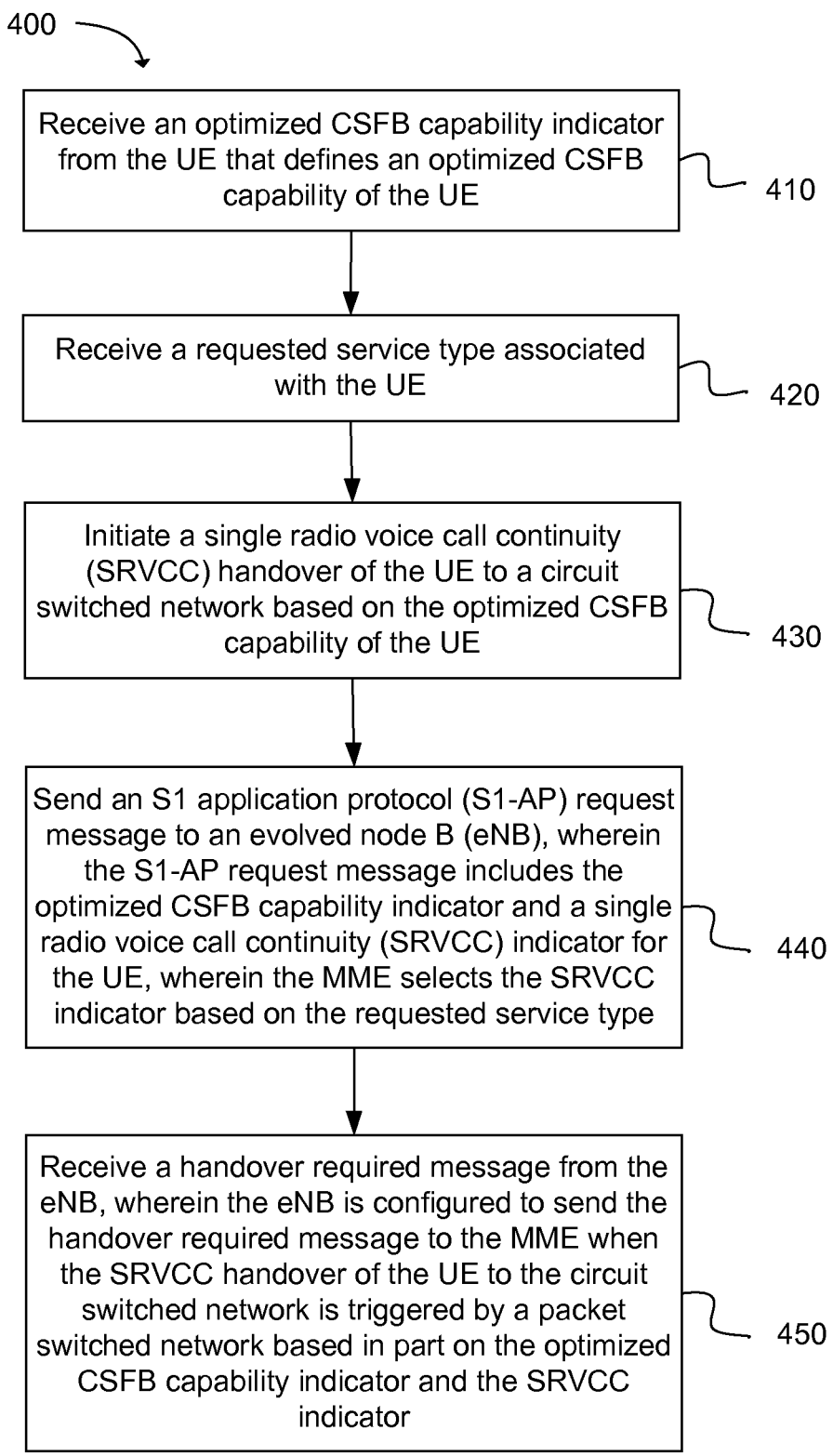
FIG. 4 depicts functionality of a mobility management entity (MME) operable to facilitate circuit switched fallback (CSFB) for a user equipment (UE) in accordance with an example.

Another example provides functionality 400 of a mobility management entity (MME) comprising one or more processors configured to facilitate circuit switched fallback (CSFB) for a user equipment (UE), as shown in the flow chart in FIG. 4. The functionality can be implemented as a method or the functionality can be executed as instructions on a machine, where the instructions are included on at least one computer readable medium or one non-transitory machine readable storage medium. The one or more processors can be configured to receive an optimized CSFB capability indicator from the UE that defines an optimized CSFB capability of the UE, as in block 410. The one or more processors can be configured to receive a requested service type associated with the UE, as in block 420. The one or more processors can be configured to initiate a single radio voice call continuity (SRVCC) handover of the UE to a circuit switched network based on the optimized CSFB capability of the UE, as in block 430. The one or more processors can be configured to send an S1 application protocol (S1-AP) request message to an evolved node B (eNB), wherein the S1-AP request message includes the optimized CSFB capability indicator and a single radio voice call continuity (SRVCC) indicator for the UE, wherein the MME selects the SRVCC indicator based on the requested service type, as in block 440. The one or more processors can be configured to receive a handover required message from the eNB, wherein the eNB is configured to send the handover required message to the MME when the SRVCC handover of the UE to the circuit switched network is triggered by a packet switched network based in part on the optimized CSFB capability indicator and the SRVCC indicator, as in block 450.

In one example, the one or more processors are further configured to receive the optimized CSFB capability indicator from the UE via an attach request message or a tracking area update (TAU) request message. In another example, the one or more processors are further configured to receive the optimized CSFB capability indicator from the UE via an extended service request message. In yet another example, the one or more processors are further configured to identify the optimized CSFB capability indicator based on an update location acknowledgement message that is received from a home subscriber server (HSS), the update location acknowledgement message including a UE subscriber profile that indicates the optimized CSFB capability of the UE In one example, the one or more processors are further configured to receive the requested service type from a mobile switching center (MSC) via a paging request message. In another example, the optimized CSFB capability indicator is a "0" to indicate that the UE does not support SRVCC based CSFB or a "1" to indicate that the UE does support SRVCC based CSFB. In yet another example, the one or more processors are further configured to receive an extended service request message from the UE for a mobile originated (MO) call. In addition, the one or more processors are further configured to receive a paging request message from a mobile switching center (MSC) for a mobile terminated (MT) call.

In one configuration, the circuit switched network is a Universal Terrestrial Radio Access Network (UTRAN) or a Global System for Mobile Communications (GSM) Enhanced Data Rates for GSM Evolution Radio Access Network (GERAN). In another configuration, the requested service type is one of: voice, video, unstructured supplementary service data (USSD), location service (LCS) or unknown. In yet another configuration, the SRVCC indicator notifies the eNB on whether or not to initiate the SRVCC/video SRVCC (vSRVCC), wherein the SRVCC indicator is a "0" to indicate to the eNB that no SRVCC/vSRVCC or legacy CSFB is expected, wherein the SRVCC indicator is a "1" to indicate to the eNB that SRVCC is expected, wherein the SRVCC indicator is a "2" to indicate to the eNB that vSRVCC is expected.

In one example, the one or more processors are further configured to initiate a packet switched to circuit switched (PS-CS) handover procedure when there is no CQI=1 bearer associated with the UE. In another example, the one or more processors are further configured to trigger a packet switched to circuit switched (PS-CS) handover procedure when the requested service type is for voice or video by sending a PS to CS request message for a SRVCC purpose to a mobile switching center (MSC) server, wherein the PS to CS request message includes the optimized CSFB capability indicator.

Figure 5:
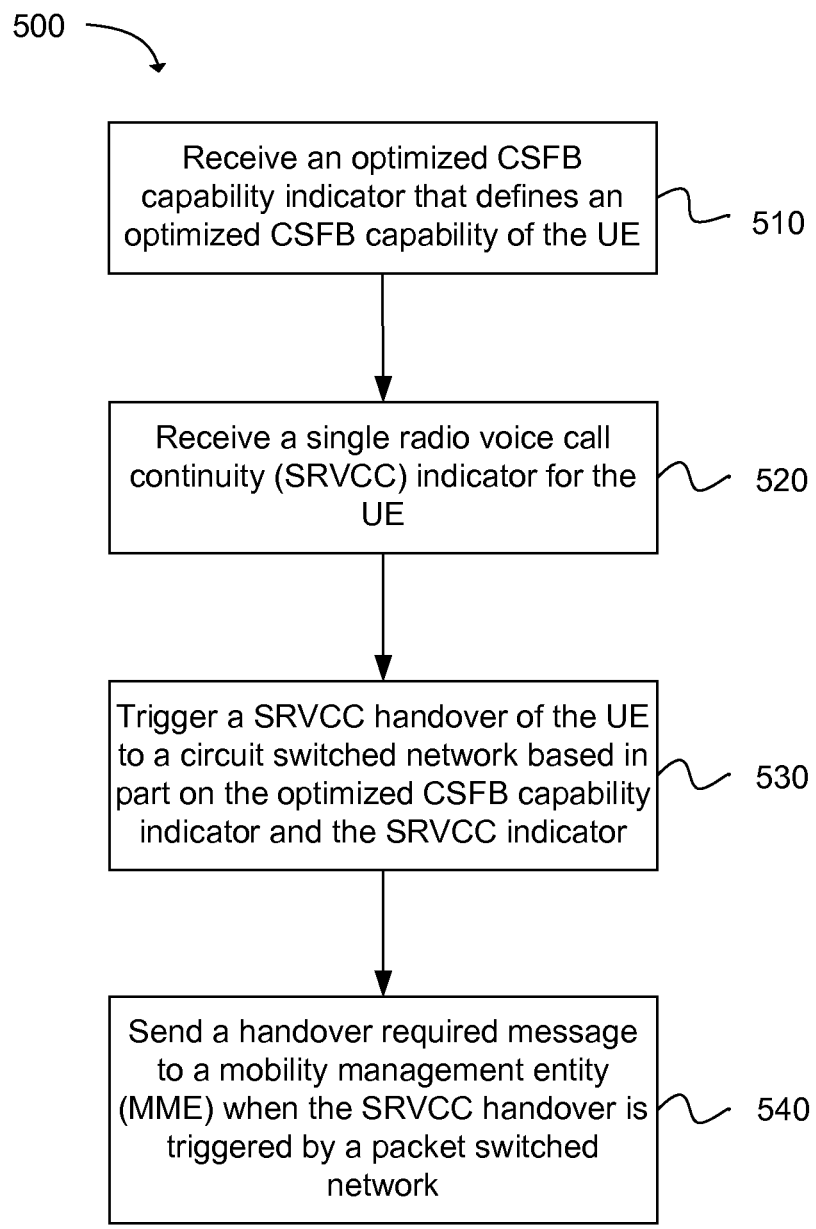
FIG. 5 depicts functionality of an evolved node B (eNB) operable to facilitate circuit switched fallback (CSFB) for a user equipment (UE) in accordance with an example.

Another example provides functionality 500 of an evolved node B (eNB) comprising one or more processors configured to facilitate optimized circuit switched fallback (CSFB) for a user equipment (UE), as shown in the flow chart in FIG. 5. The functionality can be implemented as a method or the functionality can be executed as instructions on a machine, where the instructions are included on at least one computer readable medium or one non-transitory machine readable storage medium. The one or more processors can be configured to receive an optimized CSFB capability indicator that defines an optimized CSFB capability of the UE, as in block 510. The one or more processors can be configured to receive a single radio voice call continuity (SRVCC) indicator for the UE, as in block 520. The one or more processors can be configured to trigger a SRVCC handover of the UE to a circuit switched network based in part on the optimized CSFB capability indicator and the SRVCC indicator, as in block 530. The one or more processors can be configured to send a handover required message to a mobility management entity (MME) when the SRVCC handover is triggered by a packet switched network, as in block 540.

In one example, the one or more processors are further configured to receive the optimized CSFB capability indicator from the UE via a feature group indicator (FGI). In another example, the one or more processors are further configured to trigger the SRVCC handover of the UE to the circuit switched network when there is no CQI=1 bearer associated with the UE. In yet another example, the one or more processors are further configured to receive the optimized CSFB capability indicator from the MME.

In one configuration, the SRVCC indicator notifies the eNB on whether or not to initiate SRVCC/video SRVCC (vSRVCC), wherein the SRVCC indicator is a "0" to indicate to the eNB that no SRVCC/vSRVCC or legacy CSFB is expected, wherein the SRVCC indicator is a "1" to indicate to the eNB that SRVCC is expected, wherein the SRVCC indicator is a "2" to indicate to the eNB that vSRVCC is expected. In another configuration, the circuit switched network is a Universal Terrestrial Radio Access Network (UTRAN) or a Global System for Mobile Communications (GSM) Enhanced Data Rates for GSM Evolution Radio Access Network (GERAN).

Figure 6:
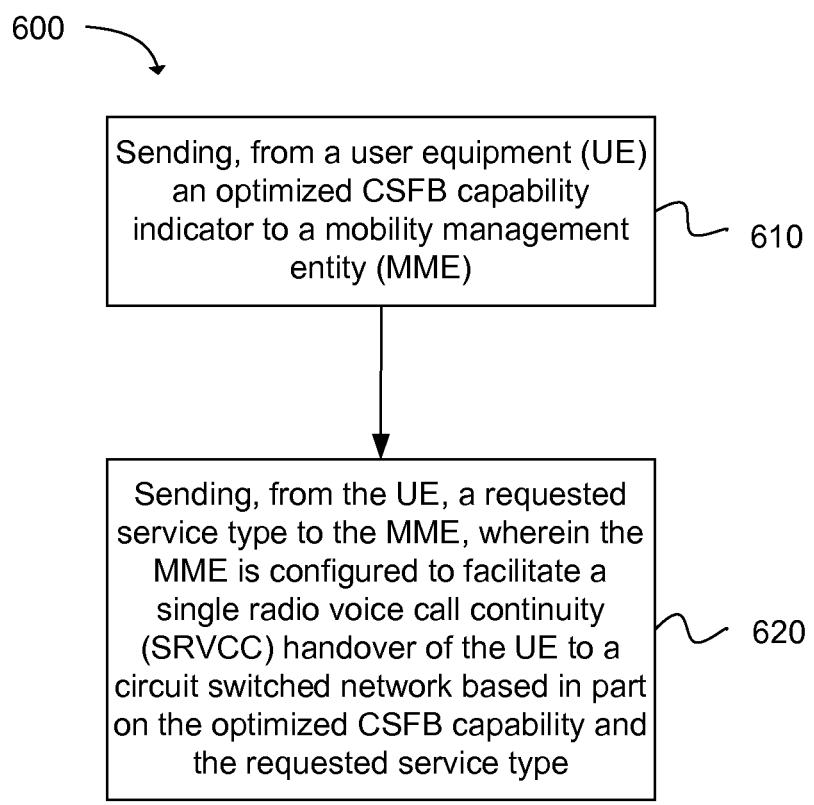
FIG. 6 depicts a flow chart of a method for facilitating circuit switched fallback (CSFB) for a user equipment (UE) in accordance with an example.

Another example provides a method 600 for facilitating optimized circuit switched fallback (CSFB), as shown in the flow chart in FIG. 6. The method can be executed as instructions on a machine, where the instructions are included on at least one computer readable medium or one non-transitory machine readable storage medium. The method can include the operation of sending, from a user equipment (UE) an optimized CSFB capability indicator to a mobility management entity (MME), as in block 610. The method can include the operation of sending, from the UE, a requested service type to the MME, wherein the MME is configured to facilitate a single radio voice call continuity (SRVCC) handover of the UE to a circuit switched network based in part on the optimized CSFB capability and the requested service type, as in block 620.

In one example, the method can include the operation of sending the optimized CSFB capability indicator from the UE to the MME via an attach request message or a tracking area update (TAU) request message. In another example, the method can include the operation of sending at least one of the optimized CSFB capability indicator or the requested service type from the UE to the MME via an extended service request message. In yet another example, the optimized CSFB capability indicator is a "0" to indicate that the UE does not support SRVCC based CSFB or a "1" to indicate that the UE does support SRVCC based CSFB. In addition, the requested service type is one of: voice, video, unstructured supplementary service data (USSD), location service (LCS) or unknown.

Figure 7:
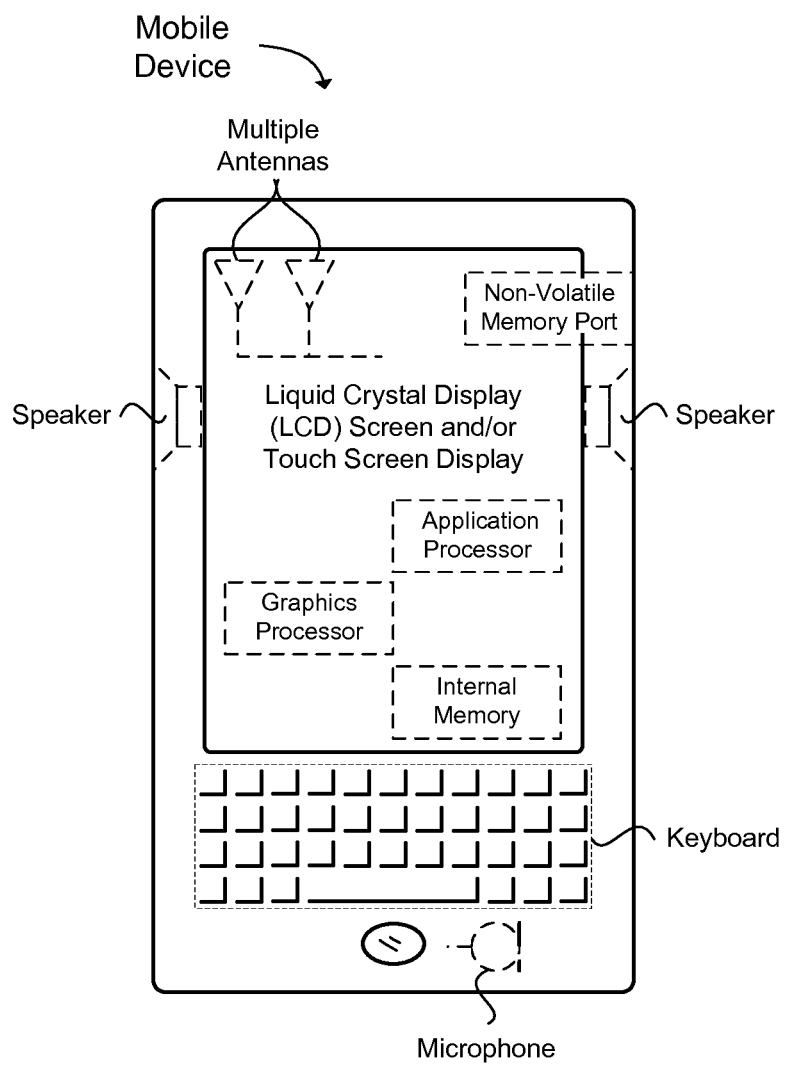
FIG. 7 illustrates a diagram of a wireless device (e.g., UE) in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mobility management entity (MME) operable to facilitate circuit switched fallback (CSFB) for a user equipment (UE), the MME comprising one or more processors and memory, wherein the one or more processors are configured to:
    receive an optimized CSFB capability indicator from the UE that defines an optimized CSFB capability of the UE;
    receive a requested service type associated with the UE;
    initiate a single radio voice call continuity (SRVCC) handover of the UE to a circuit switched network based on the optimized CSFB capability of the UE;
    send an S1 application protocol (S1-AP) request message to an evolved node B (eNB), wherein the S1-AP request message includes the optimized CSFB capability indicator and a single radio voice call continuity (SRVCC) indicator for the UE, wherein the MME selects the SRVCC indicator based on the requested service type; and
    receive a handover required message from the eNB, wherein the eNB is configured to send the handover required message to the MME when the SRVCC handover of the UE to the circuit switched network is triggered by a packet switched network based in part on the optimized CSFB capability indicator and the SRVCC indicator.

2. The MME of claim 1, wherein the one or more processors are further configured to receive the optimized CSFB capability indicator from the UE via an attach request message or a tracking area update (TAU) request message.

3. The MME of claim 1, wherein the one or more processors are further configured to receive the optimized CSFB capability indicator from the UE via an extended service request message.

4. The MME of claim 1, wherein the one or more processors are further configured to identify the optimized CSFB capability indicator based on an update location acknowledgement message that is received from a home subscriber server (HSS), the update location acknowledgement message including a UE subscriber profile that indicates the optimized CSFB capability of the UE.

5. The MME of claim 1, wherein the one or more processors are further configured to receive the requested service type from a mobile switching center (MSC) via a paging request message.

6. The MME of claim 1, wherein the optimized CSFB capability indicator is a "0" to indicate that the UE does not support SRVCC based CSFB or a "1" to indicate that the UE does support SRVCC based CSFB.

7. The MME of claim 1, wherein the one or more processors are further configured to receive an extended service request message from the UE for a mobile originated (MO) call.

8. The MME of claim 1, wherein the one or more processors are further configured to receive a paging request message from a mobile switching center (MSC) for a mobile terminated (MT) call.

9. The MME of claim 1, wherein the circuit switched network is a Universal Terrestrial Radio Access Network (UTRAN) or a Global System for Mobile Communications (GSM) Enhanced Data Rates for GSM Evolution Radio Access Network (GERAN).

10. The MME of claim 1, wherein the requested service type is one of: voice, video, unstructured supplementary service data (USSD), location service (LCS) or unknown.

11. The MME of claim 1, wherein the SRVCC indicator notifies the eNB on whether or not to initiate the SRVCC/video SRVCC (vSRVCC), wherein the SRVCC indicator is a "0" to indicate to the eNB that no SRVCC/vSRVCC or legacy CSFB is expected, wherein the SRVCC indicator is a "1" to indicate to the eNB that SRVCC is expected, wherein the SRVCC indicator is a "2" to indicate to the eNB that vSRVCC is expected.

12. The MME of claim 1, wherein the one or more processors are further configured to initiate a packet switched to circuit switched (PS-CS) handover procedure when there is no CQI=1 bearer associated with the UE.

13. The MME of claim 1, wherein the one or more processors are further configured to trigger a packet switched to circuit switched (PS-CS) handover procedure when the requested service type is for voice or video by sending a PS to CS request message for a SRVCC purpose to a mobile switching center (MSC) server, wherein the PS to CS request message includes the optimized CSFB capability indicator.

14. An evolved Node B (eNB) operable to facilitate optimized circuit switched fallback (CSFB) for a user equipment (UE), the eNB comprising one or more processors and memory, wherein the one or more processors are configured to:
receive an optimized CSFB capability indicator that defines an optimized CSFB capability of the UE;
receive a single radio voice call continuity (SRVCC) indicator for the UE;
trigger a SRVCC handover of the UE to a circuit switched network based in part on the optimized CSFB capability indicator and the SRVCC indicator;
send a handover required message to a mobility management entity (MME) when the SRVCC handover is triggered by a packet switched network;
receive an S1 application protocol (S1-AP) request message from the MME, wherein the S1-AP request message includes the optimized CSFB capability indicator and a single radio voice call continuity (SRVCC) indicator for the UE; and
trigger the SRVCC handover of the UE to the circuit switched network when there is no CQI=1 bearer associated with the UE.

15. The eNB of claim 14, wherein the one or more processors are further configured to receive the optimized CSFB capability indicator from the UE via a feature group indicator (FGI).

16. The eNB of claim 14, wherein the one or more processors are further configured to receive the optimized CSFB capability indicator from the MME.

17. The eNB of claim 14, wherein the SRVCC indicator notifies the eNB on whether or not to initiate SRVCC/video SRVCC (vSRVCC), wherein the SRVCC indicator is a "0" to indicate to the eNB that no SRVCC/vSRVCC or legacy CSFB is expected, wherein the SRVCC indicator is a "1" to indicate to the eNB that SRVCC is expected, wherein the SRVCC indicator is a "2" to indicate to the eNB that vSRVCC is expected.

18. The eNB of claim 14, wherein the circuit switched network is a Universal Terrestrial Radio Access Network (UTRAN) or a Global System for Mobile Communications (GSM) Enhanced Data Rates for GSM Evolution Radio Access Network (GERAN).

19. A method for facilitating optimized circuit switched fallback (CSFB), the method comprising:
sending, from a user equipment (UE) an optimized CSFB capability indicator to a mobility management entity (MME);
sending, from the UE, a requested service type to the MME, wherein the MME is configured to facilitate a single radio voice call continuity (SRVCC) handover of the UE to a circuit switched network based in part on the optimized CSFB capability and the requested service type;
sending, from the MME, an S1 application protocol (S1-AP) request message to an evolved node B (eNB), wherein the S1-AP request message includes the optimized CSFB capability indicator and an SRVCC indicator for the UE, wherein the MME selects the SRVCC indicator based on the requested service type; and
receiving a handover required message from the eNB, wherein the eNB is configured to send the handover required message to the MME when the SRVCC handover of the UE to the circuit switched network is triggered by a packet switched network based in part on the optimized CSFB capability indicator and the SRVCC indicator.

20. The method of claim 19, further comprising sending the optimized CSFB capability indicator from the UE to the MME via an attach request message or a tracking area update (TAU) request message.

21. The method of claim 19, further comprising sending at least one of the optimized CSFB capability indicator or the requested service type from the UE to the MME via an extended service request message.

22. The method of claim 19, wherein the optimized CSFB capability indicator is a "0" to indicate that the UE does not support SRVCC based CSFB or a "1" to indicate that the UE does support SRVCC based CSFB.

23. The method of claim 19, wherein the requested service type is one of:
 voice, video, unstructured supplementary service data (US SD), location service (LCS) or unknown.

* * * * *